United States Patent [19]

Lauck

[11] 4,109,025

[45] Aug. 22, 1978

[54] PROTEIN ENRICHED BAKED GOODS

[75] Inventor: Robert M. Lauck, New City, N.Y.

[73] Assignee: Stauffer Chemical Company, Westport, Conn.

[21] Appl. No.: 750,947

[22] Filed: Dec. 15, 1976

[51] Int. Cl.$^2$ .................. A21D 2/34; A21D 13/08
[52] U.S. Cl. ............................... 426/551; 426/23; 426/552; 426/553; 426/653
[58] Field of Search ............... 426/23, 551, 583, 653, 426/656, 657, 549, 552, 553, 554, 555

[56] References Cited

U.S. PATENT DOCUMENTS

| 3,269,843 | 8/1966 | McKee et al. | 426/549 |
| 3,876,805 | 4/1975 | Craig et al. | 426/583 X |
| 3,919,434 | 11/1975 | Tsen et al. | 426/553 |
| 3,930,039 | 12/1975 | Kuipers | 426/583 X |
| 3,941,895 | 3/1976 | Ash et al. | 426/553 |
| 3,982,039 | 9/1976 | Scibelli et al. | 426/583 X |

*Primary Examiner*—Raymond N. Jones
*Assistant Examiner*—Esther M. Kepplinger
*Attorney, Agent, or Firm*—Paul J. Juettner

[57] ABSTRACT

The shortening requirement of leavened baked goods can be at least partially replaced with a whey protein concentrate wherein the protein is substantially undenatured and non-oxidized. Protein enriched, lower fat content products such as biscuits are prepared.

10 Claims, No Drawings

PROTEIN ENRICHED BAKED GOODS

The present invention relates to leavened baked goods and particularly to high protein, low-fat biscuits.

Biscuits are well known baked goods generally prepared from flour, sugar, salt, shortening, a leavening system of alkaline bicarbonate such as sodium or potassium bicarbonate and a leavening acid, water, and, optionally, milk solids. Additional components in minor amounts can include flavor and color agents, nutrient supplements, preservatives, antioxidants and reducing agents.

For convenience in preparing biscuits, self-rising flour which contained flour, sodium bicarbonate and leavening acid was used. Self-rising flour (or SRF) is defined in the Federal Register of May 2, 1961, Title 21, Part 15, section 15.50(a), Definition and Standards of Identity, as follows:

"Self-rising flour, self-rising white flour, self-rising wheat flour, is an intimate mixture of flour, sodium bicarbonate, and one or more of the acid-reacting substances monocalcium phosphate, sodium acid pyrophosphate, and sodium aluminum phosphate. It is seasoned with salt. When it is tested by the method prescribed in paragraph (c) of this section not less than 0.5 percent of carbon dioxide is evolved. The acid-reacting substance is added in sufficient quantity to neutralize the sodium bicarbonate. The combined weight of such acid-reacting substance and sodium bicarbonate is not more than 4.5 parts to each 100 parts of flour used."

The term "self-rising flour" used herein is intended to describe compositions within the definition set forth above.

Milkless biscuits have a low protein value as the only source of protein is the flour. Further, a significant amount of shortening is required to prepare an acceptable biscuit. This could be a disadvantage to those on a low fat diet. It would be desirable to protein fortify a biscuit and also reduce the amount of shortening required to produce the same.

In an attempt to protein fortify a biscuit, a whey protein concentrate was added as part of the ingredients in a normal self-rising flour type biscuit. The normal level of shortening was maintained. The biscuit had no internal adhesion and crumbled.

BRIEF DESCRIPTION OF THE INVENTION

In accordance with the present invention, it has been found that these problems can be overcome by replacing all or a part of the shortening requirement in leavened baked goods and particularly biscuits with an undenatured, non-oxidized whey protein concentrate. By this discovery, acceptable high protein biscuits of good structure which contain a lower amount of saturated fat can be prepared. Up to 100% of the shortening can be replaced in leavened baked goods depending on the results desired. In preparing biscuits, it has been found that preferably up to 90% and more preferably up to 80% of the shortening requirement can be replaced.

Concentrated whey protein from cottage cheese whey is the preferred concentrate whey protein because the concentrate is characterized by a white color and bland taste.

DETAILED DESCRIPTION OF THE PRESENT INVENTION

The substantially undenatured whey protein concentrate used in the present invention can be derived from any cheese whey. Cheese whey is the by-product of the acid, or rennet coagulation of protein (i.e., casein) in milk is the manufacture of cheese. The whey obtained from the acid coagulation is called acid whey and that obtained from rennet, sweet whey.

The acid coagulation of milk protein from milk involves either the addition of lactic acid producing bacteria (e.g., *Lactobacillus sp.*) or the addition of food grade acids such as lactic or hydrochloric acid (i.e., direct acidification). Regardless of the method used to acidify milk, acidification is allowed to proceed until a pH of about 4.6 is reached. At this pH, casein becomes insolubilized and coagulates as cheese curd. The cheese produced by this method is commonly known as cottage cheese. The whey obtained by the separation and removal of this cheese curd is called cottage cheese whey.

Sweet cheese whey is obtained by the separation and removal of coagulated casein produced by the addition of a proteolytic enzyme to milk. The proteolytic enzymes generally used are known as rennin and/or pepsin. Specific examples of cheese products produced by this general method are cheddar cheese, swiss cheese and mozzarella cheese.

The whey protein concentrates can be prepared from acid (cottage) or sweet (cheddar) whey or mixtures thereof as long as the whey protein is substantially undenatured and non-oxidized. If a milky or cheesy flavor is desired, the sweet whey source can be used. If a bland flavor is desired, the acid whey is preferred. Blends of acid and sweet whey can be used when a slight milky flavor is desired.

By "substantially undenatured" is meant that at least 75% of the whey protein is undenatured protein.

The preferred cheese whey for use in preparing the concentrates used in the present invention is 100% acid (cottage cheese) whey or blends with up to 20% sweet cheese whey. The more preferred is 100% acid (cottage cheese) whey. The acid whey concentrate is preferred since it has a bland flavor which does not interfere with the other flavors in the product and a white color.

The cheese whey product is required to be a protein concentrate. As used herein, the term whey protein concentrate relates to a whey protein product having 25% or more whey protein solids. Such concentrations can be made by a number of processes including: the delactosing of whey; an electrodialysis procedure (e.g., as described by Stribley, R. C., Food Processing, Vol. 24, No. 1, p. 49, 1963); by reverse osmosis; by gel filtration as described in U.S. Pat. No. Re. 27,806; or by ultrafiltration. An illustrative method for ultrafiltration is described by Horton, B. S. et al., Food Technology, Vol. 26, p. 30, 1972.

It has been found that the most effective results are obtained using an ultrafiltered acid (cottage cheese) whey concentrate containing above 30% and preferably from about 40 to about 60% and more preferably 50 ± 5% whey protein. In a typical process, cottage cheese whey is neutralized to a pH 6.4 with 50% caustic. After storage, the pH is then adjusted to 7.2 and any solids or precipitates are removed by centrifugal clarifiers. The clarified liquor is then pasteurized. The liquor is then fed into an ultrafiltration membrane unit. The retentate is condensed and spray dried. Protein products of 25% or more whey protein can be prepared by this process. Products generally comprising from 20-80% and preferably 40-60% protein (N × 6.38), 10-30% lactose, 3-15% ash and 0.4 to 4.0% fat are obtained.

The whey protein concentrate must be substantially non-oxidized. By oxidation is meant oxidation of the sulfhydryl groups of the protein. Oxidation of the sulfhydryl groups generally occurs when the protein is treated with oxidizing agents such as peroxide. By substantially non-oxidized as used herein is meant that at least 60% of the sulfhydryl groups are non-oxidized.

The substantially non-oxidized, undenatured whey protein concentrate can be used to replace all or part of the shortening requirement of leavened baked goods. The baked goods contemplated to be benefited by the present invention include biscuits, cakes, doughnuts, and the like and mixes for preparing the same. By leavened baked goods is meant a dough lightened by a gas producing agent such as yeast or baking soda. The preferred baked goods are biscuits and the mixes therefor such as self-rising flour.

The shortening requirement can be totally or partially replaced with the whey protein concentrate. In some instances, it is desirable to replace only a portion of the shortening. For instance, in biscuits, it has been found that a small quantity of shortening is desirable for improved tenderness. A replacement of up to preferably 90% and more preferably 80% of the shortening is desired for this use. In other baking systems, total shortening replacement can be achieved. Partial replacement can be achieved for protein fortification and reduction in saturated fat content.

The whey protein concentrate can be included in the dry ingredients used to prepare the baked good such as in a mix, i.e., self-rising flour. The protein can be admixed during the manufacture of the biscuit dough.

The present invention will be more fully illustrated in the examples which follow.

EXAMPLES 1-5

Biscuits were prepared from flour blends wherein various levels of shortening were replaced with the protein concentrate. The following formulation was used:

ered rolling pin and dusting flour. The dough was cut into ten 5.08 centimeter (2 inches) biscuits and baked in 20.32 centimeter (8 inch) round tared pans at 232° C. (450° F) for 14 minutes.

After baking, the biscuits were evaluated for height, weight, volume, specific volume, pH and taste.

Biscuit bake tests and evaluation of the results therefrom are explained in Cereal Laboratory Methods, 6th Ed., American Association of Cereal Chemists, 1957 pp. 46-48.

The dough weight is the weight of seven biscuits just prior to baking. The biscuit weight is the weight of seven biscuits just after baking. The six most evenly sloped biscuits are measured to provide biscuit height. The volume is determined by the number of cubic centimeters of rape seed displaced by seven biscuits. Seven weighed biscuits are placed in a cake pan and rape seeds are poured over the biscuits. The rape seeds are then leveled with the top of the pan. The rape seeds in the pan are poured off and their volume measured. By substracting the value from the known volume of the entire pan, the volume of the biscuits can be determined. The specific volume is obtained by dividing the volume by biscuit weight. Biscuit weight is in grams. The specific volume is an indicator of the relative lightness and fluffiness of the baked biscuits. Biscuits having a specific volume of less than 3.0 cubic centimeters per gram have been found to be unacceptable in comparison to a homemade biscuit. Tenderness and taste were determined organoleptically.

Alkalinity is determined by breaking open a baked item and applying to either the cold or hot crumb a few drops of "Stauffer Special Indicator for Self-Rising Flour" available from Stauffer Chemical Company, Westport, Conn. The color which develops indicates the acidic alkaline condition of the baked item using the following color code:

| Magenta | Alkaline |
| Red | Slightly Alkaline |
| Red mottled with Yellow | Normal |
| Yellow mottled with Red | Slightly acidic |
| Yellow | Acidic |

| | Examples 1-5 | | | | |
|---|---|---|---|---|---|
| Example | 1 | 2 | 3 | 4 | 5 |
| Flour - grams | 240 | 250.4 | 238.2 | 262.7 | 250.4 |
| Shortening - grams | | | | | |
| Emulsified | 20.8 | — | — | — | — |
| Unemulsified | 20.8 | 10.4 | 20.8 | — | — |
| Whey Protein Concentrate-g. | | 20.8 | 20.8 | 18.9 | 20.8 |
| Buttermilk Solids - grams | 9.3 | 9.3 | 9.3 | 9.3 | 9.3 |
| Salt - grams | 6.2 | 6.2 | 6.2 | 6.2 | 6.2 |
| Sugar - grams | 3.1 | 3.1 | 3.1 | 3.1 | 3.1 |
| Sodium Bicarbonate - grams | 5.4 | 5.4 | 5.4 | 5.4 | 5.4 |
| SALP[1] - grams | 5.6 | 5.6 | 5.6 | 5.6 | 5.6 |
| Glycerine - grams | — | — | — | — | 10.4 |
| Water - milliliters | 157.5 | 157.5 | 157.5 | 157.5 | 157.5 |

[1] Levair, leavening acid. Stauffer Chemical Company, Westport, Connecticut.

In all cases, the dry ingredients were mixed together by stirring. Then the shortening or glycerine was added. This mixture was blended in a Hobart C-100 mixer for 5 minutes at speed 1. The water was then added and the dough was mixed for 15 seconds at speed 2. The dough was rolled on a cloth covered board with 1.22 centimeter (½ inch) gauge rails using a cloth cov- The results are reported in Table I below. These results show that a tender biscuit can be prepared by replacing a large proportion of the shortening with a whey protein concentrate.

TABLE I

| Example | percent** Shortening | Dough Weight (7) Grams | Biscuit Weight (7) Grams | Height of 6 Centimeters (inches) | Volume of 7 c.c. | Specific Volume | pH | Comment |
|---|---|---|---|---|---|---|---|---|
| 1 | 100% | 233 | 204 | 23.5 (9.25) | 600 | 2.94 | 7.78 | Tender Good Taste |
| 2 | 25% | 233 | 207 | 25.4 (10) | 630 | 3.04 | 7.43 | Tender Good Taste |
| 3 | 50% | 230 | 200 | 22.86 (9) | 600 | 3.00 | 7.39 | Tender Good Taste |
| 4 | 0% | 230 | 204 | 26 (10.25) | 630 | 3.09 | 7.44 | Tough Slightly Cheesy Taste |
| 5 | 25%* | 230 | 201 | 25.4 (10) | 650 | 3.23 | 7.36 | Tough |

*Glycerine
**Percent of the amount of the original shortening requirement of the recipe used in the experiment.

EXAMPLES 6–12

The use of various amounts of whey protein concentrate in biscuits without shortening was evaluated. The formulation and procedure of Example 4 (no shortening) was followed with the exception that variations were made in the flour and whey protein concentrate levels.

The formulations and baking results are reported in Table II below. These examples show that lower amounts of whey protein concentrate are more desirable.

amounts of each of the preceding ingredients is listed in Table III along with the baking results. Examples 18–22 are duplications of Examples 13–17 using a different brand of flour and shortening than used in Examples 13–17.

The results show that an acceptable biscuit containing a large percentage of high efficiency protein can be prepared in the absence of shortening (Compare Examples 13 and 16, 18 and 21). With the use of a smaller amount of shortening than normally required, a high protein biscuit can be prepared which is substantially equivalent to a regular biscuit.

TABLE II

| Example | Flour Grams | Whey Protein Concentrate Grams | Dough Weight (7) Grams | Biscuit Weight (7) Grams | Height (6) Centimeters (inches) | Volume c.c. | Specific Volume | Comment |
|---|---|---|---|---|---|---|---|---|
| 6 | 258.8 | 22.8[2] | 232 | 208 | 22.2 (8.75) | 490 | 2.36 | Slightly Alkaline Crusty Top |
| 7 | 229.9 | 51.7[2] | 230 | 203 | 20.3 (8) | 495 | 2.44 | Wet Dough, Very Dark Tops Crusty, Chewy Crumb |
| 8 | 260.3 | 21.3[3] | 229 | 201 | 22.5 (8.875) | 490 | 2.44 | Slightly Alkaline Crusty Top |
| 9 | 233.3 | 48.3[3] | 230 | 203 | 21 (8.25) | 540 | 2.66 | Wet Dough, Very dark tops Bulged sides, Crusty chewy crumb |
| 10 | 262.6 | 19[4] | 231 | 206 | 22.9 (9) | 485 | 2.35 | Slightly Alkaline, crusty top light brown, tougher sides |
| 11 | 238.6 | 43[4] | 230 | 203 | 22.2 (8.75) | 545 | 2.68 | Top not as dark as Example 9, yellowish crumb, milky taste |
| 12 | 232.3 | 48.5[3] | 227* | 198 | 21.6 8.5 | 540 | 2.73 | Slightly alkaline more tender crumb Dark tops, crusty, after taste |

*Contains 0.3 grams Calcium Stearoyl-2-lactylate.
[2]ENRPRO-50, Lot 1, prepared from acid whey
[3]ENRPRO-50, Lot 2, prepared from acid whey
[4]ENRPRO-50, Lot 3, prepared from blends of sweet whey and acid whey.

EXAMPLES 13–22

Various combinations of shortening, whey protein concentrate, flour and lysine were tested in biscuits using the formulation and procedure of Example 1. The The percent protein is the protein content of the final baked biscuit in percent by weight. A normal biscuit such as the control has approximately 6.5% to 7% protein.

The results are reported in Table III below.

TABLE III

| Example | Flour Grams | Shortening, g Emulsified | Shortening, g Unemulsified | Whey Protein Concentrate Grams | Lysine Grams | Dough Weight (7) Grams | Biscuit Weight Grams | Height (6) Centimeters (inches) | Volume c.c. | Specific Volume | % Protein | Comment |
|---|---|---|---|---|---|---|---|---|---|---|---|---|
| 13 (Control) | 240 | 20.8 | 20.8 | — | — | 232 | 207 | 22.9 (9) | 560 | 2.71 | 6.5–7 | Light Tops-Tender Slightly alkaline |
| 14 | 204.1 | — | 20.8 | 56.7 | — | 231 | 203 | 22.2 (8.75) | 555 | 2.73 | 15.1 | Dark brown tops, Crusty sides & tops |
| 15 | 239.8 | — | 20.8 | 19.7 | 1.35 | 234 | 207 | 22.9 | 570 | 2.75 | 10.44 | Lighter tops |

TABLE III-continued

| Example | Flour Grams | Shortening, g Emulsified | Shortening, g Unemulsified | Whey Protein Concentrate Grams | Lysine Grams | Dough Weight (7) Grams | Biscuit Weight Grams | Height (6) Centimeters (inches) | Volume c.c. | Specific Volume | % Protein | Comment |
|---|---|---|---|---|---|---|---|---|---|---|---|---|
| 16 | 264.4 | — | — | 15.8 | 1.45 | 233 | 206 | 25.4 (9) (10) | 530 | 2.27 | 10.47 | More tender sides & tops Lighter tops crusty sides & tops |
| 17 | 164.8 | — | 41.6 | 74 | 1.25 | 230 | 200 | 20.3 (8) | 590 | 2.95 | 17.35 | Very dark brown tops More tender sides |
| 18 (Control) | See Example 13 | | | | | 232 | 205 | 24.8 (9.75) | 540 | 2.63 | 6.5-7 | See Example 13 |
| 19 | See Example 14 | | | | | 233 | 206 | 24.1 (9.5) | 550 | 2.67 | 15.1 | See Example 14 |
| 20 | See Example 15 | | | | | 231 | 205 | 24.8 (9.75) | 540 | 2.63 | 10.44 | See Example 15 |
| 21 | See Example 16 | | | | | 230 | 202 | 24.8 (9.75) | 500 | 2.48 | 10.47 | See Example 16 |
| 22 | See Example 17 | | | | | 230 | 202 | 22.2 (8.75) | 570 | 2.82 | 17.35 | See Example 17 |

From these data it can be seen that high protein fortification and fat reduction can be achieved in shortening containing leavened baked goods such as biscuits by replacing a portion of the shortening requirement of the baked goods with a substantially undenatured and non-oxidized whey protein concentrate.

The invention is defined in the claims which follow.

What is claimed is:

1. A process for preparing a leavened dough mixture for the production of leavened baked goods normally containing shortening which comprises replacing at least part of the shortening requirement of said baked goods with a whey protein concentrate containing at least 25% protein wherein the protein is substantially undenatured and non-oxidized, said concentrate being in an amount effective to improve the volume of said baked goods.

2. The process as recited in claim 1 wherein said baked goods are biscuits.

3. The process as recited in claim 2 wherein up to 90% of the shortening is replaced.

4. The process as recited in claim 2 wherein up to 80% of the shortening requirement is replaced.

5. The process as recited in claim 2 wherein said biscuits are self-rising flour biscuits.

6. The process as recited in claim 1 wherein said whey protein concentrate is cottage cheese whey concentrated by ultrafiltration.

7. The process as recited in claim 1 wherein said whey protein concentrate has from about 40 to about 60% by weight protein.

8. The product produced by the process of claim 1 wherein the shortening replacer consists of the whey protein concentrate defined therein.

9. The product produced by the process of claim 2 wherein the shortening replacer consists of the whey protein concentrate defined therein.

10. The process as recited in claim 1 wherein the dough is baked for a period of time sufficient to produce a baked product.

* * * * *